Feb. 25, 1936.                J. F. CRAIG                2,032,167
                        ELECTROPNEUMATIC BRAKE
                        Filed Feb. 28, 1933
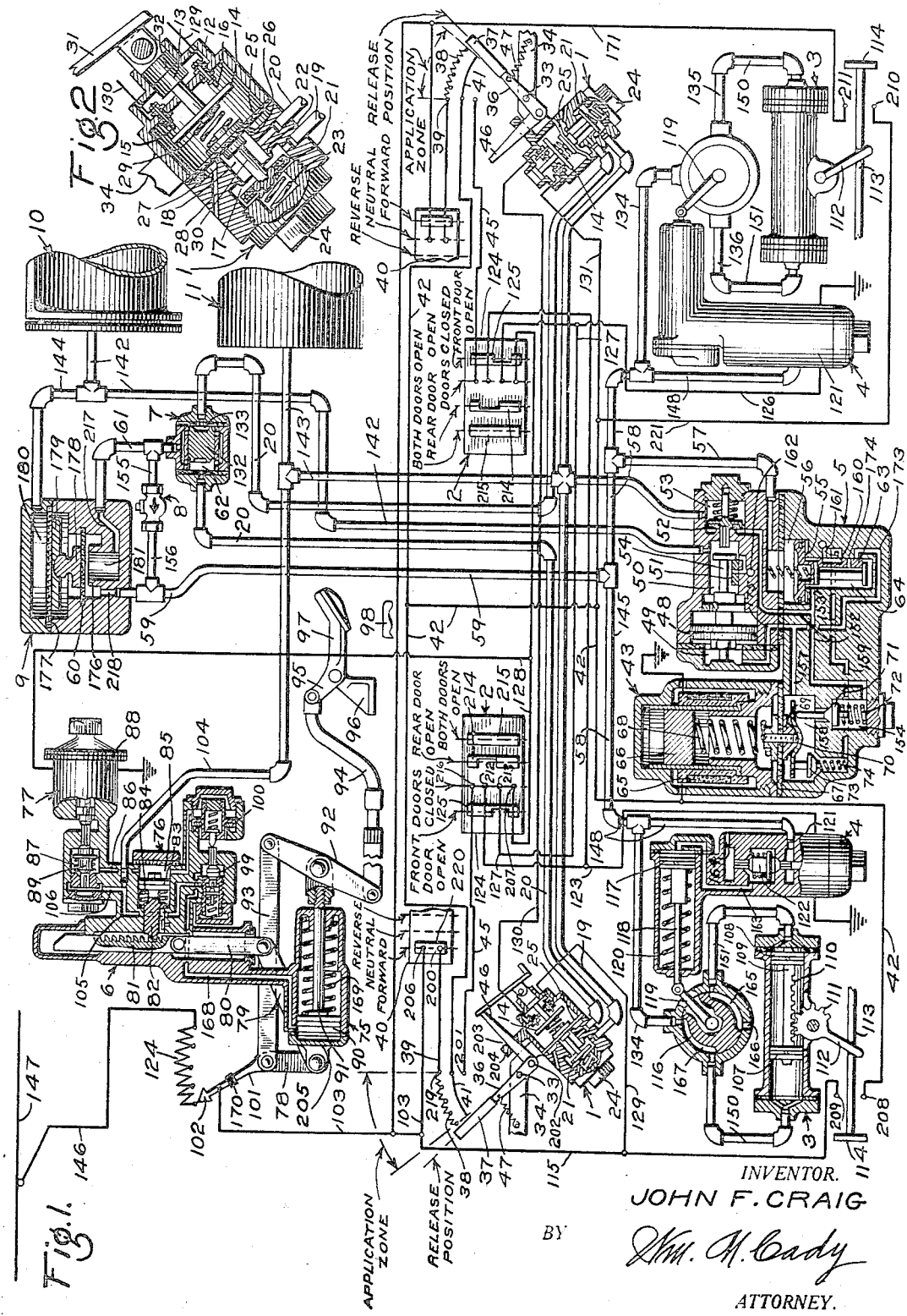
INVENTOR.
JOHN F. CRAIG
BY
Wm. H. Cady
ATTORNEY.

Patented Feb. 25, 1936

2,032,167

UNITED STATES PATENT OFFICE 2,032,167

ELECTROPNEUMATIC BRAKE

John F. Craig, Upper Montclair, N. J., assignor to The Westinghouse Air Brake Company, Wilmerding, Pa., a corporation of Pennsylvania Application February 28, 1933, Serial No. 658,924

13 Claims. (Cl. 303—22)

This invention relates to safety car control equipments and has for its principal object to provide an improved electro-pneumatic safety car control equipment.

In the accompanying drawing: Fig. 1 is a diagrammatic view, mainly in section, of a foot controlled safety car control equipment embodying my invention; and Fig. 2 is an enlarged sectional view of the foot controlled combined brake switch and safety control device shown in section at the left hand side of Fig. 1.

As shown in Fig. 1, the safety car control equipment is of the type adapted to be controlled from either end of the car and may comprise, at each end of the car, a foot controlled combined brake switch and safety control device 1, a door controlling switch device 2, a door operating engine 3, and a door engine magnet valve device 4. The equipment may also comprise a brake control valve device 5, a variable load device 6, a double check valve device 7, a check valve device 8, a cut-off valve device 9, a brake cylinder 10, and a main reservoir 11.

Each of the foot controlled combined brake switch and safety control devices 1 may comprise a casing 12, in which is slidably mounted a plunger 13 which carries on the inner end thereof a contact switch 14 which is adapted to connect the insulated contacts 15 and 16 carried by the casing.

The contact 16 in the combined brake switch and safety control device 1 at the left hand end of the car is connected by a wire 129 to a wire 115 which is, in turn, connected to a movable contact 102 of the variable load device 6, which will be described hereinafter, and the contact 15 is connected by a wire 130 to the contact 16 in the combined brake switch and safety control device 1 at the right hand end of the car. The contact 16 in the latter device is connected by a wire 131 to a wire 42 leading to the brake controlling magnet valve device 43, and since the contact switch 14 in said latter device bridges the contacts 15 and 16, as will be evident from the detailed description hereinafter, it will be seen that the circuit is complete from the contact 15 in the combined brake switch and safety control device 1 at the left hand end of the car to the brake controlling magnet valve device 43.

The casing 12 has a chamber 17 in constant communication with the main reservoir 11 through the pipe 19, and a chamber 18 constantly connected to the safety control pipe 20. A valve 21 contained in the chamber 17 is adapted to seat on a seat rib 22 provided in the casing for closing off communication from the chamber 17 to the chamber 18, said valve being subject to the pressure of a coil spring 23 interposed between and engaging the valve and a cap nut 24, which has screw-threaded connection with the casing 12 for closing the open end of chamber 17. A flexible diaphragm 25 mounted in the casing 12 is adapted to engage a seat rib 26 provided in the casing for closing off communication from the chamber 18 to a chamber 27 in communication with the atmosphere through a passage 28, the diaphragm valve being resiliently pressed to its seat through the medium of a coil spring 29 interposed between and engaging the diaphragm valve and the contact switch 14, said spring also acting to urge said contact switch to a position where it bridges the contacts 15 and 16.

Preferably carried by the diaphragm valve 25, centrally thereof and extending through the chamber 18, is a stem 30 which engages the valve 21. When the diaphragm valve is seated, closing communication from the chamber 18 to the atmospheric chamber 27, the valve 21 will be maintained away from its seat by the stem 30, thereby opening the chamber 17 to the chamber 18. Also, when the diaphragm valve 25 is unseated, opening the chamber 18 to the atmospheric chamber 27, the valve 21 will be held seated by the spring 23, thereby closing comunication from chamber 17 to the chamber 18.

To provide for manual control of the contact switch 14, the diaphragm valve 25 and the valve 21, a foot pedal 31 is provided which has pivotally mounted thereon a plunger 32 which is adapted to be slidably and removably positioned in the casing 12 of each combined brake switch and safety control device 1, and when the plunger 32 is positioned in the casing, it engages the end of the plunger 13.

Pivotally mounted, by means of a pin 33, on a bracket 34 provided on the casing 12 is an arm 36 which carries at its free end an insulated contact 37, said contact being adapted, when the arm 36 is rotated in a clockwise direction, to connect contacts associated with a variable resistance unit 38 to a contact 41, the variable resistance unit being connected by the wire 39 to a contact 200 in the controller reverser 40 and the contact 41 being connected by the wire 42 to the brake controlling magnet valve device 43, which will be described hereinafter, so as to vary the resistance in the circuit to said magnet.

The contact 37 is also adapted in one position of the arm 36 to connect a contact 219 of the variable resistance unit 38 with the contact 41 and with a contact 201, which is connected by a wire 45 to a contact 216 in the door controlling switch device 2, which will be described hereinafter.

The end of the arm 36 opposite the end carrying the contact 37 is pivotally connected, by means of a pin 202, to an arm 46 which is adapted to be engaged by the forward end of the foot pedal 31, so that when said pedal is depressed, the consequent downward movement of the arm 46 will cause the arm 36 to be rotated in a clockwise direction, the arm 36 being normally maintained in release position, as shown in the drawing, by the spring 47, which is secured at one end to the arm 36 and at the other end to the bracket 34. The arm 46 is slidably supported and guided within an opening 203 provided in a lug 204 mounted on the casing 12.

The brake control valve device 5 comprises a relay valve device, an emergency valve device and a magnet valve device responsive to variations in the current supply thereto for controlling the operation of the relay valve device.

The relay valve device comprises a piston 48 having, at one side, a chamber 49 and, at the other side, a chamber 50 connected by a pipe 142 to the brake cylinder 10 and containing a release slide valve 51 adapted to be operated by said piston. Said relay valve device also comprises a fluid pressure supply valve 52 contained in valve chamber 53 and adapted to be operated by the stem 54 of the piston 48, said valve chamber being connected by a pipe 143 to the main reservoir 11.

The emergency valve device comprises a piston 55 contained in a piston chamber 56 which is connected to pipe 57, which pipe is normally connected to the safety control pipe 20, as will hereinafter be described. The emergency valve device also comprises a slide valve 63 contained in a valve chamber 64 and adapted to be operated by the piston 55.

The magnet valve device 43 for controlling the supply of fluid under pressure to and the release from the piston chamber 49 for controlling the operation of the relay valve device may comprise a magnet coil 65 having one terminal connected to the wire 42 and the other terminal to ground and having a solenoid core 66. Said device also comprises a flexible diaphragm 67, and carried by the diaphragm 67 is a member 69 having a ball-shaped end which engages a plate 70 in a corresponding recess, one end of the plate engaging the stem of a pilot supply valve 71, which is subject to the pressure of a coil spring 72 tending to seat said valve, and the other end of said plate engaging the stem of a pilot release valve 73, which is subject to the pressure of a coil spring 74 tending to unseat said valve. Interposed between the diaphragm 67 and the solenoid core 66 is a coil spring 68 which is adapted to be compressed by the movement of the solenoid core 66, the movement of the core being proportioned to the extent that the coil 65 is energized.

According to one feature of my invention, the braking power is varied according to the load on the car by providing means controlled by the load on the car for varying the current supply to the magnet coil 65, and for this purpose a load controlled apparatus is employed comprising a strut cylinder 75, a locking mechanism 76 and a magnet valve device 77.

Pivotally mounted on the cap 205 of the strut cylinder 75 is a crank arm member having the crank arms 78 and 79. Carried preferably by the arm 78 is an arm 101 having mounted thereon a contact member 102, a section of insulating material 170 being interposed in the arm 101 to insulate the contact member 102 from the arm 101. The contact member 102 is permanently connected by the wire 103 to a contact 206 in the controller reverser 40. When the arm 101 is rotated, the contact member 102 engages contacts associated with a variable resistance unit 124, one terminal of which is connected to a current supply wire 146 which is supplied with current from the trolley wire 147, so that the resistance in the current supply circuit is varied, and thereby the current supplied to the magnet coil 65, by operation of the contact member 37.

The arm 79 is connected by a link 80 to a ratchet bar 81 slidably mounted in the casing of the locking mechanism 76, and a pawl 82 is adapted to engage the teeth of the ratchet bar, the pawl being operatively connected to a piston 83, which piston is subject on one side to the pressure of a spring 84 and on the opposite side to fluid under pressure as supplied to a chamber 85 through a passage 86 from the chamber 87 of the magnet valve device 77.

The magnet valve device 77 may comprise a magnet 88 and a double beat valve 89. The coil of the magnet 88 is connected by a wire 128 to a contact 207 in the door controlling switch device 2.

The strut cylinder 75 contains a piston 90 having a stem 91 which is pivotally connected to a lever 92. One end of the lever 92 is pivotally connected to a rod 93, the other end of said rod being pivotally connected to the arm 78. The other end of the lever 92 is pivotally connected to a rod 94 which is operatively connected to an arm 95 of a bell crank member which is pivotally mounted on a bracket 96. The bracket 96 is secured to some portion of the car body. The other arm 97 of the bell crank member is adapted, upon a clockwise movement, to engage a member 98 mounted on the car trucks (not shown).

The fluid pressure on piston 90 is controlled by a double beat valve 99 and the operation of the double beat valve is controlled by a piston 100, one side of which is in constant communication with the piston chamber 85.

The main reservoir 11 or other source of fluid under pressure is connected by the pipes 143 and 104 to a passage 105 leading to the double beat valve 99 and through a branch passage 106 to the double beat valve 89.

The opening and closing of the car doors is controlled by the door engine 3 at each end of the car, which comprises a piston cylinder containing the pistons 107 and 108 connected together by a stem 109 carrying a rack bar 110. The teeth of the rack bar engage the teeth of a gear segment 111 and said segment is provided with a lever arm 112, to which is operatively connected a rod 113 for operating the car door (not shown). Mounted on the rod 113 is a switch member 114 which, at the left hand end of the car is adapted to connect a contact 208 to a contact 209, said contact 208 being connected by the wire 42 to the magnet coil 65 of the brake controlling magnet valve device 43, and said contact 209 being connected by the wire 115 to the wire 103. The switch member 114 at the right hand end of the car is adapted to connect a contact 210 to a contact 211, the contact 210 being connected by the wires 221 and 42 to the magnet coil 65 and the contact 211 being connected by the wire 171 to the wire 103.

The supply of fluid under pressure to and the release of fluid under pressure from the pistons 107 and 108 is controlled by a rotary valve 116 and said valve is operable by a piston 117 having a stem 118 which is connected to the valve by an arm or lever 119.

When the rotary valve 116 is held by the arm 119 in the door closing position, as shown in the drawing, pipe 134, which is normally connected to the safety control pipe, as will be hereinafter described, is connected by a cavity 167 in said rotary valve to the pipe 150 leading to the piston 107 and the pipe 151 leading to the piston 109 is connected by a cavity 165 to the atmospheric exhaust port 166. When the rotary valve 116 is rotated in an anti-clockwise direction by the arm 119 to the door opening position, the pipe 134 is connected by the cavity 165 to the pipe 151 and the pipe 150 is connected to the atmospheric exhaust port 166.

A spring 120 urges the piston 117 in one direction and the supply of fluid under pressure to and the release of fluid under pressure from the opposite side of the piston is controlled by the door engine magnet valve device 4 associated with each door engine and comprising a magnet 121 and a double beat valve 122 adapted to be operated by said magnet. The magnet 121 at the left hand end of the car is connected by a wire 123 to a contact 212 in the door controlling switch device 2. The magnet 121 at the right hand end of the car is connected to a contact 213 in the door controlling switch device 2 at the left hand end of the car by means of the wires 126 and 127.

The door controlling switch device 2 at each end of the car is shown in diagrammatic development form and may comprise a movable drum 124 carrying the insulated contacts 125, 214 and 215, which are adapted to engage and connect with a plurality of stationary contacts 216, 212, 213 and 207, which are connected to the wires 45, 123, 127 and 128, respectively, for the purpose of controlling the car doors and the operation of the variable load device 6.

The double check valve device 7 is interposed in the piping between the safety control pipe 20 and pipe 61, and may comprise a casing containing a double check valve 132, the chamber 62 at one side of said check valve and the chamber 133 at the other side being connected to the respective safety control pipe 20 leading to the combined brake switch and brake controlling devices 1 at the opposite ends of the car. The double check valve 132 is slidable in the casing, and in its right hand position, as shown in the drawing, establishes communication between the safety control pipe 20 leading to the left hand end of the car and the pipe 61, and closes off communication from the safety control pipe 20 leading to the right hand end of the car and the pipe 61.

The cut-off valve device 9 controls communication from pipe 61 and the safety control pipe 20 to pipe 59 and may comprise a casing having a passage 217 connected to pipe 61 and a passage 218 connected to pipe 59. Mounted in the casing is a diaphragm valve 60 which is adapted to be moved so as to seat on a seat rib 176 formed in the casing and close off communication between the passages 217 and 218. Also mounted in the casing is a flexible diaphragm 177 which, through the medium of the follower members 178 and 179, is adapted to control the operation of valve 60. The chamber 180 at one side of the diaphragm 177 is constantly connected through the pipes 144 and 142 to the brake cylinder 10.

In operation, the main reservoir 11 being maintained charged with fluid under pressure in the usual manner, fluid under pressure is supplied therefrom through pipes 143 and 19 to the chamber 17 in the combined brake switch and safety control device 1 at each end of the car and to the supply valve chamber 53 of the brake control valve device 5, and thence from the latter chamber through a passage 152 to the pilot supply valve chamber 154. Fluid supplied to the passage 152 also flows through a passage 153 to the emergency slide valve chamber 64.

Assuming that the car is being operated from the left hand end of the car, and that the right hand end is the non-operating end, at which the pedal has been removed, the spring 23 of the device 1 at the non-operating end maintains the valve 21 seated on the seat rib 22 and said spring, acting through the medium of the valve 21 and the stem 30 maintains the diaphragm valve 25 away from its seat rib 26. Due to the fact that the diaphragm valve is thus held unseated, chamber 133 in the double check valve device 7 is maintained connected to the atmosphere through the pipe 20 on the non-operating end of the car, chamber 18, past the unseated diaphragm valve 25, chamber 27 and the atmospheric passage 28, for a purpose which will be explained hereinafter. The valve 21 being held seated, communication is cut off from the supply chamber 17 to the vented chamber 18.

Further, the spring 29 in the combined brake switch and safety control device 1 at the non-operating end of the car maintains the contact switch 14 in the closed position, wherein said switch bridges the contacts 15 and 16, for a purpose which will be apparent from the description hereinafter. Also, the spring 47 at the non-operating end maintains the contact 37 in the position shown in Fig. 1, in which the circuit contact 41 is disconnected from the variable resistance unit 38.

At the operating end of the car, the combined brake switch and safety control device 1 is normally maintained, by the pressure of the operator's foot, in the position shown in the drawing, in which the diaphragm valve 25 is held seated and the valve 21 is held unseated. Fluid under pressure supplied to the chamber 17, as previously mentioned, flows into the safety control pipe 20 by way of the unseated valve 21 and chamber 18.

Fluid thus supplied to the pipe 20 flows into chamber 62 of the double check valve device 7, causing the check valve 132 to move to its right hand seated position, if it should not already be in that position, due to the fact that the chamber 133 in said device is vented through the combined brake switch and safety control device 1 at the non-operating end of the car, as explained hereinbefore. From chamber 62, fluid flows to the emergency piston chamber 56 of the brake control valve device 5 through pipe 61, passage 217, chamber 181 and passage 218 in the cut-off valve device, the diaphragm valve 60 being unseated since the chamber 180 is vented through the brake cylinder pipe 142, as hereinbefore described, and thence through pipes 59, 58 and 57.

Fluid under pressure supplied to pipe 61, as above described, may also flow to pipe 59 by way of the pipe 155, the check valve device 8 and the pipe 156, but this is of no significance at this time.

Because the foot pedal 31 at the operating end of the car is held depressed, as explained, the contact switch 14 is held away from the contacts 15 and 16, so that a safety control circuit is held open, the circuit being traced as follows, beginning at the current supply wire 115: wire 129, contact 16, contact switch 14, contact 15, wire 130, and contact 15, contact switch 14 and contact 16 in the combined brake switch and safety control device 1 at the non-operating end of the car, and the wires 131 and 42 leading to the brake controlling magnet valve device 43.

Assuming that the pedal 31, while being held depressed is also maintained in the position shown at the left, then the arm 36 will be held in the normal, or release position, shown in Fig. 1, by the spring 47, in which position the contact 37 is not in engagement with the contact 41 and the contacts associated with the variable resistance unit 38, so that, with the controller reverser 40 at the operating end of the car in the "forward" position, the circuit is open, which includes the contact member 102, wire 103, the contacts 206, 220 and 200 in the controller reverser 40, wire 39, the variable resistance unit 38, the contact 41, wire 42 and the brake controlling magnet valve device 43.

Inasmuch as the circuit of the magnet valve device 43 is open, due to the position of the contact 37 and the position of the contact switch 14 at the operating end of the car, the magnet valve device 43 remains deenergized. The solenoid core 66 therefore remains in the position shown in Fig. 1, and the spring 68 not being under compression, the diaphragm 67 remains flexed upwardly, permitting the spring 72 to seat the pilot supply valve 71 and the spring 74 to unseat the pilot release valve 73.

With the pilot release valve 73 unseated as described, the relay piston chamber 49 in the brake control valve device 5 is connected to the atmosphere through the passages 175 and 157, chamber 158, past the unseated pilot release valve 73, chamber 74, passage 159, cavity 160 in the emergency slide valve 63 and the atmospheric passage 161.

The brake cylinder 10 is open to the atmosphere through pipe 142, valve chamber 50, past the release valve 51 and then through the atmospheric passage 162.

It will be noted that with the contact 37 of the combined brake switch and safety control device 1 at the operating end of the car in the normal position shown in Fig. 1, the circuit is open from the contact 219 to the contact 201, said contact 219 being connected, as hereinbefore described, to the current supply wire 103 by wire 39, and contacts 200, 220 and 206 in the controller reverser 40, and the contact 201 being connected by wire 45 to contact 216 in the door controlling switch device 2. The door controlling switch device will normally be carried in the door closing position, in which the circuit is also open at the contacts 216, 212 and 213 from the wire 45 to the wires 123 and 127 leading to the door engine magnet valve devices 121 at the operating and non-operating ends of the car, respectively. With the circuit to the magnet valve devices 121 open, said devices remain deenergized and the double beat valve 122 remains in a position wherein the passage 163 leading to piston 117 is connected to the atmospheric exhaust port 164. The piston 117 being subject to atmospheric pressure, the spring 120 holds piston 117 in its right hand position and the valve 116 in the position in which it is shown in the drawing, in which a cavity 165 connects pipe 151, leading to the door opening piston 108, with an atmospheric exhaust port 166. The door closing piston 107 is subject to fluid under pressure supplied through the pipe 58, pipes 148 and 134, the cavity 167 in the valve 116 and pipe 150.

The piston 107 at each end of the car being thus subject to fluid pressure while piston 108 is subject to atmospheric pressure, the piston will be held in the door closed position, in which the lever 112 operates through rod 113 to hold the car door (not shown) closed. When the car door is closed, the switch member 114 is positioned by lever 113 so that said member does not close the circuit from the wire 115 to the wire 42.

When the car is running along the road, with all doors closed, as described, the circuit including the wire 128 leading to the magnet valve device 77 of the variable load device 6 is open at the door controlling switch device 2 and said magnet remains deenergized. The double beat valve 89 will then be in the position shown in Fig. 1, in which communcation is open for supplying fluid under pressure from the main reservoir 11 to the piston chamber 85 through pipes 143 and 104, and passages 105 and 106, past the unseated double beat valve 89, thence through the chamber 87 and passage 86, causing the piston 83 to be held in its left hand position so as to maintain the pawl 82 in engagement with the teeth in the ratchet bar 81.

Fluid under pressure in piston chamber 85 is also supplied to piston 100 so that the double beat valve 99 is held in the position shown in Fig. 1, in which the piston 90 is connected through passage 168 with the atmosphere. Spring 169 then acts to hold piston 90 in its retracted position, so that the arm 97 does not engage the member 98. Movement of the car truck will therefore not be transmitted to the mechanism in the variable load device while the car is running.

If it is desired to apply the brakes, the foot pedal 31 is rotated in an anti-clockwise direction from the position shown in Fig. 1, causing the arm 36 to be rotated in a clockwise direction into the application zone, so that the contact 37 connects the contact 41 with the contacts of the variable resistance unit 38, dependent upon the degree of brake application desired. Current will then be supplied to the circuit including the magnet coil 65 which varies according to the amount of resistance which is cut into the circuit by the positioning of the contact 37.

Due to the energization of the magnet coil 65, the solenoid core 66 will be shifted downwardly by the magnetic pull of said magnet coil, thereby compressing the spring 68. Since the spring 68 acts on the diaphragm 67, said diaphragm will be flexed downwardly by the pressure of the spring. Since the spring 72 acting on the pilot supply valve 71 is preferably somewhat heavier than the spring 74 acting on the pilot release valve 73, the initial movement of the plate 70 by the diaphragm 67 operates, with the stem of the valve 71 acting as a fulcrum, to move the valve 73 downwardly to its seat, closing off communication from the chamber 158 to the atmosphere through passage 159, cavity 160 in the emergency slide valve 63 and the passage 161. Further movement of the diaphragm 67 then rocks the plate 70, with the stem of the valve 73 acting as a fulcrum, so as to unseat the valve 71.

Fluid under pressure supplied from the main reservoir 11 through the pipe 143 to the chamber 53 flows therefrom to the relay piston chamber 49 through the passage 152, chamber 154, past the unseated valve 71, chamber 158 and passages 157 and 175. The piston 48 is then operated by fluid pressure to first shift the release slide valve 51, so as to cut off communication from the brake cylinder 10 to the atmosphere through pipe 142, chamber 50, past the release slide valve 51, and through the passage 162, and then further movement of the piston stem 54 operates to unseat the supply valve 52, so that fluid under pressure is supplied from the valve chamber 53 and the main reservoir 11 to valve chamber 50 and from thence through pipe 142 to the brake cylinder 10, thus causing the brakes to be applied by fluid under pressure supplied to the brake cylinder. Fluid supplied to pipe 142 will also flow to chamber 180 in the cut-off valve device 9, for a purpose which will be explained hereinafter.

When the pressure in chamber 158, acting on the diaphragm 67, slightly exceeds the opposing pressure of the spring 68, the diaphragm 67 will be flexed upwardly, so as to permit the pilot supply valve 71 to be seated by the spring 72, since the pressure of the spring 72 will act on the plate 70, during the upward movement of said plate, so as to tilt the plate, with the stem of the pilot release valve 73 acting as a fulcrum.

It will now be seen that both the pilot supply valve 71 and the pilot release valve 73 are closed or lapped and the parts will remain in this position so long as the pressure in the piston chamber 49 corresponds with the pressure to which the spring 68 is set.

When the pressure of fluid supplied to valve chamber 50 has been increased to a degree slightly in excess of the pressure of fluid supplied to the piston chamber 49, the piston 48 will be shifted so as to permit the valve 52 to seat and thus cut off the further supply of fluid to the brake cylinder.

If, while the brakes are applied, it is desired to increase the braking force, the foot pedal 31 is rotated still farther in an anti-clockwise direction, causing the arm 36 to be rotated farther in a clockwise direction so as to cut out a greater amount of resistance of the variable resistance unit 38. In this way, the strength of current supplied to the magnet coil 65 is increased, and the coil being thus more strongly energized, the solenoid core 66 is operated to further compress the spring 68 so as to further deflect the diaphragm 67 downwardly and thereby again open the valve 71. Fluid under pressure will then again be supplied to the piston chamber 49 until the pressure in said chamber and in chamber 158 is slightly in excess of the opposing pressure of the spring 68, when the diaphragm 67 will again be flexed upwardly, permitting the valve 71 to be closed, in the manner hereinbefore described.

The increase of pressure in piston chamber 49, due to the unseating of the valve 71, as described, will cause said piston to operate so as to cause the valve 52 to be unseated to admit a further supply of fluid to the brake cylinder, as hereinbefore described.

The degree of brake cylinder pressure obtained is determined by the amount of resistance of the variable resistance unit 38 cut out of the circuit to the magnet coil 65 by the contact 37, the maximum pressure being obtained when the contact 37 is so positioned that all of the resistance of the variable resistance unit 38 is cut out of the circuit to the magnet coil 65, or in other words, when the contact 37 connects the contact 219 direct to the contact 41, this position of the contact 37 being known hereinafter as the "full application" position.

If the operator wishes to open the car doors, he first rotates the foot pedal 31 in an anti-clockwise direction until the contact 37 is in full application position, in which the brakes are applied in a full application, as just described. In this position, the contact 37 connects the contact 219 to the contact 201, so that the circuit is complete from the supply wire 103 to the contact 216 in the door controlling switch device 2, which circuit includes the contacts 206, 220 and 200 in the controller reverser 40, wire 39, contact 219, contact 37, contact 201, and wire 45.

With the contact 37 in full application position, if the operator desires to open the front door and to maintain the rear door closed, he moves the door controlling switch device 2 to "front door open" position, in which the contact 125 bridges the contacts 216 and 212. The circuit is now complete from the supply wire 103 to the door engine magnet valve device 4, which circuit includes the contacts 206, 220 and 200 in the controller reverser 40, wire 39, contact 219, contact 37, contact 201, wire 45, contacts 125, 216 and 212, and wire 123.

The flow of current to the magnet 121 of the magnet valve device 4 at the front end of the car energizes said magnet, causing the double beat valve 122 to be seated on the upper seat and unseated from the lower seat. The seating of valve 122 on the upper seat cuts off communication from the passage 163 to the atmospheric passage 164 and the unseating of valve 122 from the lower seat opens the passage 163 to the pipe 148, so that fluid supplied to said pipe from the charged safety control pipe, as hereinbefore described, will flow past said unseated valve and through passage 163 to the piston 117. Said piston is moved by fluid under pressure and the rotary valve 116 is operated to cause cavity 165 to connect pipe 134 to pipe 151 and to cause cavity 167 to connect pipe 150 to the exhaust port 166.

Fluid under pressure is then supplied to the door opening piston 108 while the door closing piston 107 is vented, and consequently the pistons 107 and 108 are shifted toward the left hand, causing the rod 113 to be operated so as to effect the opening of the front doors.

The movement of the rod 113 causes the switch member 114 to bridge the contacts 209 and 208, thereby closing the circuit from the supply wire 103 to the magnet coil 65 of the brake controlling magnet valve device 43 through the wire 115, contact 209, switch member 114, contact 208 and wire 42, for a purpose which will now be described.

If the operator should attempt to release the brakes by permitting the contact 37 to move in an anti-clockwise direction toward release position, as will be described hereinafter, before the door has started to close, he cannot do so because, while the circuit to the magnet coil 65 of the brake controlling magnet valve device 43 will be opened by the disconnection of the contact 219 from the contact 201 as the contact 37 is moved out of full application position, current will still be supplied from the wire 115 through the switch member 114 to the wire 42, to maintain the brake controlling magnet valve device 43 energized.

If it is desired to open the rear door and maintain the front door closed, the operator moves the door controlling switch device 2 to "rear door open" position, in which the contact 214 bridges the contacts 216 and 213. With the contact 37 in full application position, as described, the circuit is now complete from the supply wire 103 to the magnet 121 of the door engine magnet valve device 4 at the rear end of the car, which circuit includes the contacts 206, 220 and 200 in the controller reverser 40, wire 39, contact 219, contact 37, contact 201, wire 45, contacts 216, 214 and 213 in the door controlling switch device 2 and wires 127 and 126.

The flow of current to the magnet 121 at the rear end of the car energizes said magnet, causing the door operating engine 3 at the rear end of the car to be operated so as to open the rear door, in a manner similar to the operation of the door operating engine 3 at the front end of the car, hereinbefore described, for opening the front door.

The operation of the door operating engine for opening the rear door also causes the switch member 114 to close a circuit from the supply wire 193 to the magnet coil 65 of the brake controlling magnet valve device 43, which circuit includes the wire 171, contact 211, switch member 114, contact 210 and wires 221 and 42, so as to maintain the brakes applied while the rear door is open, as hereinbefore described in connection with the operation of the door operating engine for controlling the operation of the front door.

If it is desired to open both doors, the operator moves the door controlling switch device 2 to "both doors open" position, in which the door opening sides of both door operating engines are supplied with fluid under pressure and in which the door closing sides of these engines are vented to atmosphere, in the manner hereinbefore described, causing the engines to operate to open both doors. Further, each switch member 114 is operated to close a circuit to the brake controlling magnet valve device 43, as hereinbefore described.

When it is desired to close the doors, the door controlling switch device 2 is moved to "doors closed" position, in which the supply of current to the magnets 121 is cut off by the opening of the circuits of the contacts 216, 212 and 213. Each magnet 121 is thereby deenergized and the double beat valve 122 is operated so as to reestablish communication from the piston 117 to the atmosphere through passage 163, past the unseated double beat valve 122 and the atmospheric port 164. Spring 120 will then shift the piston 117 to its right hand position and the valve 116 to the position shown in the drawing, in which the cavity 165 connects the pipe 151, leading to piston 108, with the atmospheric exhaust port 166 and in which the fluid pressure supply pipe 134 is connected by the cavity 167 to the pipe 150 leading to piston 107.

Due to the venting of fluid from the door opening piston 108 and the supply of fluid under pressure to the door closing piston 107, said pistons will be shifted to the door closing position, as shown in the drawing, effecting the closing of the doors and the opening of the circuit from the contact 209 to the contact 208 by the movement of the switch member 114 at the front end of the car and the opening of the circuit from the contact 211 to the contact 210 by the movement of the switch member 114 at the rear end of the car. The opening of said circuits will not deenergize the brake controlling magnet valve device 43 because said device is still energized by the current supplied through the combined brake switch and safety control device 1 and the brakes therefore remain applied until released in the manner hereinafter described.

It will be seen that only after the door controlling switch device 2 has been moved to doors closed position and thereby effected operation of the door engines to close the doors and to move the switch member 114 at the front end of the car out of engagement with the contacts 208 and 209 and the switch member 114 at the rear end of the car out of engagement with the contacts 210 and 211 can the brakes be released because, as hereinbefore described, the brake controlling magnet valve device 43 is maintained energized by the closing of the circuit to said device through the switch member 114 until the doors have started to close.

When the door controlling switch device 2 is moved to a door opening position, the contact 216 is connected to the contact 207, and with the contact 37 of the combined brake switch and safety control device 1 in full application position, current is permitted to flow from the wire 45 to the wire 128 and from thence to the magnet 88 of the magnet valve device 77 of the variable load device 6, causing said magnet to be energized. The energization of the magnet 88 then effects the movement of the double beat valve 89 so as to cut off communication from passage 106 to chamber 87 and thence to passage 86 and thereby cut off the supply of fluid under pressure to the piston chamber 85, and to open communication from said chamber to the atmosphere by way of passage 86 and chamber 87 and thence past the unseated valve 89.

The venting of fluid pressure from the piston chamber 85 permits the spring 84 to shift the piston 83 outwardly, thus releasing the pawl 82 from engagement with the teeth of the rack bar 81, so that said bar is free to slide.

When fluid is vented from piston chamber 85, fluid is also vented from the piston 100, so that the double beat valve 99 is operated to cut off the atmospheric vent from passage 168 and open communication from the main reservoir through passage 105 to passage 168. Fluid under pressure is then admitted to piston 90, so as to shift said piston outwardly, causing the arm 97 to engage the member 98. The end of the rod 94 connected to the lever 92 then acts as a fulcrum for said lever and further movement of the lever 92 depends upon the relative position of the member 98 associated with the car truck with respect to the position of the bracket 96, which is movable with the car body.

If the load on the car is now increased by passengers entering the car, the downward movement of the car body causes the lever 92 to rotate in a clockwise direction so that the rod 93 is pulled toward the right hand. This movement of the rod 93 also operates to rotate the crank arms 78 and 79 in a clockwise direction.

The rotation of the crank arm 78 causes the contact arm 101 to move toward the right hand a distance which is proportional to the increase in the load on the car, and a corresponding amount of resistance is cut out of the variable resistance unit 124. Thus the current supply to the combined brake switch and safety control device 1 is proportional to the load on the car. In other words, the greater the load on the car, the less the amount of resistance in the circuit to the combined brake switch and safety control device and therefore the greater will be the current flow to the brake controlling magnet valve device 43 in any given application position of the combined brake switch and safety control device 1.

The rotation of the crank arm 79 causes ratchet bar 81 to be moved upwardly through the medium of the link 80. When the car has been loaded and the door controlling switch device 2 is moved to "doors closed" position for closing the doors, the circuit is broken from the wire 45 to the wire 128 and the magnet 88 will be deenergized. Due to the deenergization of the magnet 88, the double beat valve 89 will be operated to cut off the atmospheric vent from pistons 83 and 100 and to open communication for supplying fluid under pressure to said piston chambers.

The supply of fluid under pressure to piston chamber 85 causes the piston 83 to be moved towards the left hand so that the pawl 82 will engage the teeth of the ratchet bar 81 and thus lock said bar against movement, and consequently the arm 101 carrying the contact member 102 will be locked in its adjusted position.

When fluid under pressure is supplied to piston chamber 85, fluid is also supplied to piston 100, so that said piston operates the double beat valve 99 to open passage 168 to the atmosphere. The piston 90 is then shifted to its retracted position, in which the arm 97 of the bell crank member is moved out of engagement with the member 98.

To completely release the brakes, the operator relieves the pressure of the foot on the forward end of the foot pedal 31 so as to permit the spring 47 to rotate the arm 36 in an anti-clockwise direction to release position, opening the circuit from the variable resistance unit 38 to the contact 41 and thereby effecting deenergization of the magnet coil 65 of the brake controlling magnet valve device 43.

With the deenergization of the magnet coil 65, no magnetic pull is exerted on the solenoid core 66 so that the spring 68 is relieved of compression. This release in spring pressure on diaphragm 67 causes the higher pressure in chamber 158 on the opposite side of the diaphragm to move the diaphragm upwardly, permitting the plate 70 to be tilted upwardly by the action of the spring 74 on the pilot release valve 73, with the stem of valve 71 acting as a fulcrum for said plate, thus permitting the pilot release valve 73 to be unseated by the spring 74.

With the pilot release valve 73 unseated, piston chamber 49 is vented through passages 175 and 157, chamber 158, past the unseated valve 73, passage 159, cavity 160 in the emergency slide valve 63 and atmospheric passage 161. The pressure of the fluid in the release slide valve chamber 50 then causes the piston 48 to operate to its extreme left hand or release position, carrying with it the release slide valve 51. With the release slide valve 51 in release position, fluid under pressure from the brake cylinder 10 is vented to the atmosphere through pipe 142, chamber 50, past the release slide valve 51 and through the passage 162.

Should it be desired to effect a graduated release of the brakes, the operator, instead of permitting the contact 37 to return fully to release position, as he does in effecting a full release, may cause the contact 37 to stop in any desired intermediate position within the application zone. Upon the movement of the contact 37 toward release position, the amount of resistance of the variable resistance unit 38 cut into the circuit with the magnet coil 65 of the brake controlling magnet valve device 43 is gradually increased, thus decreasing the magnetic pull of the coil on the solenoid core 66. The decrease in the magnetic pull of the coil on said core reduces the compression of the spring 68. The higher pressure in chamber 158 on the opposite side of the diaphragm 67 then causes the diaphragm to move upwardly, permitting the plate 70 to be tilted upwardly by the action of the spring 74 on the pilot release valve 73, with the stem of valve 71 acting as a fulcrum for said plate, thus permitting the pilot release valve 73 to be unseated by the spring 74.

With the pilot release valve 73 unseated, the piston chamber 49 is vented and the release slide valve 51 is thereupon moved by the piston 48 to release position, so as to permit flow of fluid from the brake cylinder to the atmosphere, in the manner hereinbefore described. However, when the pressure of fluid in chamber 158 has been reduced to a degree less than the pressure exerted by the spring 68, the diaphragm 67 will be moved downwardly by said spring, causing the plate 70 to tilt downwardly, with the stem of valve 71 as a fulcrum, and effect the closing of the pilot release valve 73.

With the valve 73 seated, further release of fluid from piston chamber 49 is prevented and when the pressure of the fluid in the release slide valve chamber 50, and consequently in the brake cylinder 10, has been reduced slightly below that retained in chamber 49, the release slide valve 57 will be operated by the piston 48 so as to cut off further flow of fluid from the brake cylinder to the atmosphere.

Should the operator become incapacitated so that he can no longer maintain pressure on the foot pedal 31 in the combined brake switch and safety control device, an automatic application of the brakes will be effected. Upon the release of pressure from the foot pedal, the spring 29 moves said pedal upward through the medium of the plungers 13 and 32 and causes the contact switch 14 to bridge the contacts 15 and 16 in the combined brake switch and safety control device 1 at the operating end of the car, thereby closing the circuit from wire 129 to wire 130. Inasmuch as the circuit from wire 130 to wire 42, leading to the magnet valve device 43, is closed by the bridging of the contacts 15 and 16 by the contact switch 14 of the combined brake switch and safety control device 1 at the non-operating end of the car, the closing of the circuit from wire 129 to wire 130 by the contact switch 14 at the operating end of the car causes the circuit to be closed from the supply wire 146 to the magnet valve device 43 by way of the variable resistance unit 124, contact member 102, wires 103, 115 and 129, contacts 15 and 16 and contact switch 14 in the combined brake switch and safety control device 1 at the operating end of the car, wire 130, contacts 15 and 16 and contact switch 14 in the combined brake switch and safety control device 1 at the non-operating end of the car, and wires 131 and 42.

With the circuit to the magnet coil 65 of the magnet valve device 43 thus closed, the solenoid core 66 is operated by the energization of the coil 65 to effect an application of the brakes in the same manner as when said coil is energized by the movement of the contact 37 in effecting an application of brakes in the normal manner, as hereinbefore described.

Due to the pressure of the spring 29 on the diaphragm valve 25 being relieved when the operator's foot is removed from the foot pedal 31, fluid pressure in chamber 19, acting on the inner seated area of the diaphragm valve, assisted by the pressure of the spring 23 acting on the diaphragm valve through the medium of the valve 21 and the stem 30, causes said valve to be moved away from its seat rib 26, and the valve 21 will be seated by the spring 23.

With the diaphragm valve 25 unseated, fluid is vented from the emergency piston chamber 56 in the brake control valve device 5 through the pipe 57, pipes 58 and 59, and passage 218, chamber 181 and passage 217 in the cut-off valve device 9, pipe 61, chamber 62 in the double check valve device 7, pipe 20, chamber 18, past the unseated diaphragm valve 25, through chamber 27 and the atmospheric passage 28. The seating of valve 21 cuts off communication from the chamber 17 to the vented chamber 18 and thereby prevents loss of fluid supplied to chamber 17 from the main reservoir 11 through pipes 143 and 19.

The emergency piston chamber 56 being vented, the pressure of the fluid in the emergency slide valve chamber 64, as supplied from the main reservoir through pipe 143, supply valve chamber 52 and passages 152 and 153, causes the emergency piston 55 to move upwardly to emergency position, carrying with it the emergency slide valve 63. With the emergency slide valve in emergency position, the passage 173 is uncovered, permitting fluid under pressure to flow from the slide valve chamber 64 through passages 173 and 175 to the relay valve piston chamber 49.

Thus, it will be seen that if, for any reason, the magnet valve device 43 should fail to operate, fluid under pressure supplied to the piston chamber 49 through the operation of the emergency valve device will cause piston 48 to be operated, in the manner hereinbefore described, to unseat the supply valve 52, which will permit fluid under pressure to be supplied to the brake cylinder 10 to effect an emergency application of the brakes. It will also be seen that should the emergency valve device fail to operate for any reason and the magnet valve device 43 is operative to supply fluid under pressure to the piston chamber 49, the piston 48 will be operated by said fluid supply valve to effect an application of the brakes. Thus, protection is provided against failure of the brakes to apply in an emergency application in the event that either the magnet valve device 43 or the emergency valve device should fail to operate.

It will be noted that when the emergency slide valve 63 is moved to emergency position, the cavity 160 is moved out of registration with the passage 159, so as to cut off communication from the passage 159 to the atmosphere, thereby insuring that in the event that the pilot release valve 73 is unseated for any reason, such as failure of the magnet valve device 43 to operate, fluid under pressure supplied to the piston chamber 49 through the operation of the emergency piston 55 and slide valve 63 will not be vented to the atmosphere by way of passage 157, chamber 158, past the unseated pilot release valve 73, passage 159, cavity 160 and passage 161. Further, in emergency position of the slide valve 63, a port 174 in said slide valve registers with the passage 159, so that fluid is supplied from the emergency slide valve chamber 64 through said port to passage 159, chamber 158 and passage 157. Thus, when the emergency valve device operates and the magnet valve device fails to operate, the rate of build-up of fluid pressure in piston chamber 49 through the passages 173 and 175 will not be delayed by the flow of fluid from said passages into passage 157, chamber 158 and passage 159.

Fluid under pressure supplied to the pipe 142 in effecting an emergency application of the brakes flows to chamber 180 in the cut-off valve device 9 through the pipe 144. Since the chamber 181 below the diaphragm valve 60 is vented through the vented safety control pipe, fluid pressure supplied to chamber 180 will cause the diaphragm 177 to be flexed downwardly, causing the valve 60 to seat on the seat rib 176 and close communication through the safety control pipe, which, however, has no significance at this time.

The venting of the safety control pipe, as hereinbefore described, when effecting an emergency application of the brakes, causes the venting of fluid from the door closing piston 107 of the door operating engines 3 at each end of the car through pipe 150, cavity 167 in valve 116, pipes 134 and 148 and the vented pipe 58. Inasmuch as the door opening piston 108 is vented, as hereinbefore described, the door engine pistons are balanced, so that the car doors may be controlled manually.

In releasing the brakes after an emergency application, the foot pedal 31 must be depressed to the position shown at the operating end of the car in Fig. 1 and must be held in this position, in which the contact switch 14 is moved out of engagement with the contacts 15 and 16, thereby effecting deenergization of the brake controlling magnet valve device 43 and the consequent unseating of the pilot release valve 73. In this position, also the diaphragm valve 25 is seated, so as to close off communication from the safety control pipe 20 to the atmospheric passage 28, and valve 21 is unseated, so as to reestablish communication from the fluid pressure supply pipe 19 to the pipe 20.

Fluid supplied to pipe 20 flows therethrough to chamber 62 in the double check valve device 7, thence through pipe 155, and the check valve device 8, and thence through pipes 156, 59, 58 and 57 to the emergency piston chamber 56. The emergency piston 55 and slide valve 63 are thereby moved downwardly to release position.

It will here be understood that if fluid were not supplied from pipe 61 to pipe 59, by way of pipe 155, the check valve device 8 and pipe 156, it would be impossible to supply fluid to the emergency piston chamber 56 to effect a release of the brakes after an emergency application because the valve 60, being seated, cuts off communication from pipe 61 to pipe 59 through the cut-off valve device 9.

With the emergency slide valve in release position, cavity 160 again connects passage 159 to the atmospheric passage 161, permitting the release of fluid from the piston chamber 49 by way of passages 175 and 157, chamber 158, the unseated pilot release valve 73, passage 159, cavity 160, and passage 161.

With the pressure vented from the piston chamber 49, the piston 48 will be operated to its release position, carrying the slide valve 63 with it so as to permit fluid under pressure to be vented from the brake cylinder 10 to the atmosphere through pipe 142, chamber 50 and passage 162.

Fluid under pressure will be vented from chamber 180 in the cut-off valve device 9 through pipe 144 and the vented pipe 142, which will permit the valve 60 to be unseated and thereby open communication from pipe 59 to pipe 61.

When the brakes are applied in a service application, fluid under pressure is supplied to the chamber 180 in the cut-off valve device 9 by flow from the brake cylinder pipe 142 and the pipe 144. When the pressure in chamber 180 is increased sufficiently to deflect diaphragm 177, the diaphragm valve 60 will be shifted by movement of the diaphragm 177, so that said valve will engage the seat rib 176. Connection from passage 217 to passage 218, and consequently from pipe 59 to pipe 61, is thus cut off, so that the operator may remove his foot from the foot pedal 31 after having effected a predetermined application of the brakes, without causing the emergency piston 55 to be operated. It will be seen that the check valve device 8, by preventing flow of fluid from pipe 59 to pipe 61, renders the valve 60 operative to cut off communication between said pipes.

The removal of the operator's foot from the foot pedal 31 effects a full application of the brakes, however, because the contact switch 14 at the operating end of the car bridges the contacts 15 and 16 and thereby closes the circuit to the brake controlling magnet valve device 43 which will operate, in the manner hereinbefore described, to effect operation of the relay valve piston 48 to its application position.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a safety car control equipment, the combination with a brake cylinder, a pipe normally charged with fluid under pressure, electro-responsive means operative upon energization to supply fluid under pressure to said brake cylinder and operative upon deenergization to release fluid under pressure from said brake cylinder, and an emergency valve device operative upon a reduction in pressure in said pipe to supply fluid under pressure to the brake cylinder to effect an application of the brakes, of a combined foot valve and electric circuit controlling device controlled by the pressure of the foot of the operator and operative upon the relief of foot pressure on said foot valve device by the operator to effect energization of said electro-responsive means and to release fluid under pressure from said pipe.

2. In a safety car control equipment, the combination with a brake cylinder, a control pipe, electro-responsive means operative upon energization to supply fluid under pressure to the brake cylinder and operative upon deenergization to release fluid under pressure from the brake cylinder, and an emergency valve device operative upon a reduction in pressure in said pipe to supply fluid under pressure to the brake cylinder to effect an application of the brakes, of a combined foot valve and electric circuit controlling device subject to foot pressure for normally maintaining the pressure of fluid in said control pipe and for maintaining open a circuit through said electro-responsive means and operative upon the relief of foot pressure for reducing the pressure of the fluid in the control pipe and for closing the circuit through said electro-responsive means.

3. In a safety car control equipment, the combination with a brake cylinder, a pipe normally charged with fluid under pressure, electro-responsive means operative upon energization to supply fluid under pressure to the brake cylinder and operative upon deenergization to release fluid under pressure from the brake cylinder, and an emergency valve device operative upon a reduction in pressure in said pipe to supply fluid under pressure to the brake cylinder to effect an application of the brakes, of a combined foot valve and electric circuit controlling device comprising contacts in a circuit of said electro-responsive means, a switch member adapted to bridge said contacts for closing the circuit of said means for energizing said means, a valve for controlling a communication through which said pipe is adapted to be vented, and a foot pedal subject to the pressure of the foot of an operator for normally maintaining said switch member out of engagement with said contacts and for normally preventing said valve from operating to open said communication.

4. In a safety car control equipment, the combination with a brake cylinder, a pipe normally charged with fluid under pressure, electro-responsive means operative according to variations in the flow of electric current thereto for varying the pressure in the brake cylinder, and an emergency valve device operative upon a reduction in pressure in said pipe to supply fluid to the brake cylinder to effect an application of the brakes, of a combined foot valve and electric circuit controlling device comprising contacts in a circuit of said electro-responsive means, a switch member adapted to bridge said contacts for closing the circuit of said means for energizing said means to effect a predetermined application, a valve for controlling a communication through which said pipe is adapted to be vented, a contact switch adapted to control the circuit of said electro-responsive means for effecting a service application of the brakes, and a graduated application and graduated release of the brakes and a complete release of the brakes, and a foot pedal for controlling the operation of said contact switch and subject to the pressure of the foot of an operator for normally maintaining said switch member out of engagement with said contacts and for normally preventing said valve from operating to open said communication.

5. In a safety car control equipment, the combination with a brake cylinder, a pipe normally charged with fluid under pressure, electro-responsive means operative upon energization to supply fluid under pressure to the brake cylinder and operative upon deenergization to release fluid under pressure from the brake cylinder, and an emergency valve device operative upon a reduction in pressure in said pipe to supply fluid under pressure to the brake cylinder to effect an application of the brakes, of a combined foot valve and electric circuit controlling device comprising contacts in a circuit of said electro-responsive means, a switch member adapted to bridge said contacts for closing the circuit of said means for energizing said means, a valve for controlling a communication through which said pipe is adapted to be vented, a plunger, and a pedal pivotally mounted on said plunger and adapted upon a rocking motion to control the operation of said contact switch, said plunger being operative when depressed by the pressure of the operator's foot on the pedal to maintain said switch member out of engagement with said contacts and to prevent said valve from operating to open said communication.

6. In an electro-pneumatic brake, the combination with a brake cylinder and electro-responsive means operative according to variations in the flow of electric current thereto for varying the pressure in the brake cylinder, of electro-responsive means for controlling the operation of a car door and operative upon energization to effect the opening of said door, and a contact switch adapted to be moved through an application zone for varying the flow of current to the first mentioned electro-responsive means and adapted only in full application position to close a circuit through the second mentioned electro-responsive means.

7. In an electro-pneumatic brake, the combination with a brake cylinder and electro-responsive means operative according to variations in the flow of electric current thereto for varying the pressure in the brake cylinder, of electro-responsive means for controlling the operation of a car door and operative upon energization to effect the opening of said door, and a contact switch adapted to be moved through an application zone for varying the flow of current to the first mentioned electro-responsive means and adapted when moved to a predetermined position within the application zone to close a circuit through the second mentioned electro-responsive means.

8. In a safety car control equipment, the combination with a brake cylinder, a safety control pipe and an emergency valve device operative upon a reduction in the pressure in said pipe to supply fluid under pressure to the brake cylinder to effect an application of the brakes, of a door engine having a door opening and a door closing position, means for effecting the movement of said door engine in one direction to a door opening position and in another direction to a door closing position and comprising a piston operated by fluid under pressure for effecting the movement of the door engine in one direction and operative upon the relief of fluid under pressure for effecting the movement of said engine in the opposite direction, and manually controlled electro-responsive means operative upon energization to supply fluid under pressure from said safety control pipe to said piston and operative upon de-energization to vent fluid under pressure from said piston.

9. In a safety car control equipment, the combination with a brake cylinder, manually controlled means for effecting the supply of fluid under pressure to and release of fluid under pressure from the brake cylinder, a safety control pipe, an emergency valve device operative upon a reduction in pressure in said pipe to effect a supply of fluid under pressure to said brake cylinder and operative upon an increase in pressure in said pipe to cooperate with said means to effect a release of fluid under pressure from the brake cylinder, a manually operated valve device for supplying fluid under pressure to and releasing fluid under pressure from said pipe, valve means controlled by brake cylinder pressure for controlling communication from said valve device to said emergency valve device and operated upon a predetermined increase in brake cylinder pressure for closing said communication, and a one-way communication by-passing said valve means for supplying fluid under pressure from said valve device to said emergency valve device.

10. In a safety car control equipment, in combination with a brake cylinder, electroresponsive means operative according to variations in the flow of electric current thereto for varying the pressure of fluid supplied to said brake cylinder, a plurality of circuits for supplying current to said electroresponsive means, means associated with a car door for controlling one of said circuits, said circuit being completed on movement of the car door to the open position, a member for controlling another of said circuits and normally biased to a position to complete said circuit, and movable responsive to manual pressure of an operator to a position to interrupt said circuit, and a manually operated electric circuit controlling device and controlling another of said circuits for varying the flow of current to the electroresponsive means to vary the pressure of the fluid in the brake cylinder.

11. In a safety car control equipment, in combination with a brake cylinder, electroresponsive means operative according to variations in the flow of electric current thereto for varying the pressure of fluid supplied to said brake cylinder, a plurality of circuits for supplying current to said electroresponsive means, means associated with a car door for controlling one of said circuits, said circuit being completed on movement of the car door to the open position, a member for controlling another of said circuits and normally biased to a position to complete said circuit, and movable responsive to manual pressure of an operator to a position to interrupt said circuit, and a manually operated electric circuit controlling device for controlling another of said circuits for varying the flow of current to the electroresponsive means to vary the pressure of the fluid in the brake cylinder, and means associated with said last named circuit for regulating the amount of current supplied to said electroresponsive means according to the load on the car.

12. In a safety car control equipment, in combination with a brake cylinder, electroresponsive means operative according to variations in the flow of electric current thereto for varying the pressure of fluid supplied to said brake cylinder, a plurality of circuits for supplying current to said electroresponsive means, a member for controlling one of said circuits and normally biased to a position to complete said circuit, and movable responsive to manual pressure of an operator to a position to interrupt said circuit, a manually operated electric circuit controlling device for controlling another of said circuits for varying the flow of current to the electroresponsive means to vary the pressure of the fluid in the brake cylinder, common means to control said member responsive to manual pressure of an operator and the circuit controlling device, and means associated with a car door for controlling another of said circuits, said circuit being completed on movement of the car door to the open position.

13. In a safety car control equipment, the combination with a brake cylinder, manually controlled means for effecting a supply of fluid under pressure to and release of fluid under pressure from the brake cylinder, a safety control pipe, an emergency valve device operated upon a reduction in the pressure in said pipe to effect a supply of fluid under pressure to said brake cylinder and operative upon an increase in pressure in said pipe to effect a release of fluid under pressure from the brake cylinder, a manually operated valve device for supplying fluid under pressure to and releasing fluid under pressure from said pipe, valve means controlled by brake cylinder pressure for controlling communication from said valve device to said emergency valve device and operated upon a predetermined increase in brake cylinder pressure for closing said communication, and a one-way communication by-passing said valve means for supplying fluid under pressure from said valve device to said emergency valve device.

JOHN F. CRAIG.